United States Patent [19]

Martin

[11] Patent Number: 5,235,485

[45] Date of Patent: Aug. 10, 1993

[54] CLEANING TOOL

[76] Inventor: Robert D. Martin, 122 Main St., Salem, N.H. 03079

[21] Appl. No.: 732,598

[22] Filed: Jul. 19, 1991

[51] Int. Cl.$^5$ .............................................. G11B 5/41
[52] U.S. Cl. .................................... 360/128; 360/137
[58] Field of Search ................................. 360/128, 137

[56] References Cited

U.S. PATENT DOCUMENTS

| | | | |
|---|---|---|---|
| 4,622,617 | 11/1986 | Fritsch | 360/128 |
| 4,663,686 | 5/1987 | Freeman et al. | 360/128 |
| 4,868,700 | 9/1989 | Fritsch et al. | 360/128 |
| 5,150,268 | 9/1992 | Abe et al. | 360/128 |

FOREIGN PATENT DOCUMENTS

2225747 6/1990 United Kingdom ................ 360/128

Primary Examiner—Constantine Hannaher
Attorney, Agent, or Firm—Wolf Greenfield & Sacks

[57] ABSTRACT

Device for cleaning heads of disc drive units. The device comprises a substantially round member having dimensions which allow insertion of the device into the receiving area of a disc drive unit. The member has a central elongated aperture which permits reciprocating movement of the member when fully inserted in the receiving area of the disc drive unit. The cleaning device may also have notches on its outer periphery for clearing internal projections of the disc drive. A cleaning surface, preferably comprising a removable, self adhesive strip of a fibrous material, is attached to at least one surface of the member. A shield is present on the same surface of the member as the cleaning strip for protecting the cleaning strip from damage upon entry or release of the cleaning device from the receiving area of the disc drive unit.

23 Claims, 8 Drawing Sheets

CLEANING TOOL

FIELD OF THE INVENTION

This invention relates to a cleaning tool and, more particularly, to a tool for cleaning the head of a disc drive unit.

BACKGROUND OF THE INVENTION

The heads of disc drive units accumulate dust and debris and, therefore, require periodic cleaning. One form of cleaning device, for floppy diskette drive units, is a round fibrous cleaning disc which is mounted for rotatable movement within a square shaped jacket. A cleaning solution is applied through openings in the surface of the jacket prior to insertion of the cleaning tool into the receiving area of a floppy diskette drive unit. The computer is activated so that the diskette drive spindle engages and then rotates the cleaning disc across the read/write heads. A disadvantage of this type of cleaning device is that the cleaning disc, because it rotates in the same direction as the floppy data diskette, does little more than remove and then redeposit the contaminants and debris on the leading edge of the read/write heads. The read/write heads, therefore, are not effectively cleaned.

Also disadvantageous is that the same peripheral area of the cleaning disk is re used for each new cleaning operation which results in deposition of the contaminants removed in a previous cleaning back onto the read/write heads. Further, the abrasive friction from the spinning disc can cause wear on the surface of the heads. Such cleaning devices also require that the computer be turned on and the disc drive activated; some computer literacy is thus required. And finally, the flexible jacket portion of such cleaning devices has a tendency to buckle and jam when it is inserted into or released from the receiving area of the floppy diskette drive.

Non-spinnable cleaning devices also are known. U.S. Pat. No. 4,622,617 to Fritsch teaches a laterally translatable cleaning device while U.S. Pat. No. 4,663,686 to Freeman et al. teach a cleaning device with a rotatable wiper assembly. These cleaning devices may fail or require maintenance due to their several internal moving parts.

U S Pat. No. 4,868,700 to Fritsch shows a non-rotatable plate member with a surface mounted cleaning fabric. Execution of a previously stored computer program causes the read/write heads to move backwards and forwards over the stationary cleaning surface. Disadvantages of this device are that it requires that the computer be turned on, a compatible software program be pre stored in the computer's memory, and the user have some computer literacy.

The object of the present invention is to provide an improved device for cleaning heads of disc drive units, such as a read/write head of a floppy diskette drive unit, or any other magnetic data recording or playback device, including audio and video devices.

SUMMARY OF THE INVENTION

According to one embodiment of the invention, there is provided a cleaning device for a read/write head of a disc drive unit, the cleaning device having dimensions which allow insertion of the device into the receiving area of the disc drive unit. Preferably, the cleaning device is a substantially round hard plastic member with a central elongated aperture that permits reciprocating movement of the cleaning tool after the drive spindle has been activated. Preferably, the aperture is elongated in the direction parallel to the longitudinal axis of the cleaning device which permits forward to rearward movement. Alternatively, the aperture may be elongated in the direction transverse to the axis of the cleaning device, in which case movement is effected side-to-side. The cleaning tool may also have notched areas on its outer periphery which allow clearance of the internal structure of the disc drive unit A cleaning surface, preferably comprising a removable, adhesive-backed strip of spun-bonded polyester fiber or other fibrous material, is attached to the surface of the member in the area which makes contact with the head of the disc drive unit. The cleaning strip may be attached to one surface or to both surfaces of the member for dual head applications. Prior to insertion of the member into the receiving area of the disc drive unit, a cleaning solution is applied to the cleaning strips.

The read/write head typically is brought into contact with the cleaning strip by means of a latch or lock button located on the floppy diskette drive unit and adjacent to the entrance slot of the drive. For drives which do not have a drive latch or lock button, e.g., three and one half inch floppy diskette drives, the heads are brought into contact with the surface of the cleaning strips by inserting the cleaning member fully into the receiving area of the disc drive unit until the engagement arm is activated.

Cleaning a head of a disc drive unit is accomplished by manually grasping and moving a handle which extends rearwardly from the fully inserted member which causes the cleaning strip to pass back and forth against the drive head. Contaminants become embedded in the fibrous material of the cleaning strip and are thus removed from the surface of the head. In a preferred cleaning operation, the cleaning tool is moved forwardly and rearwardly to cause the cleaning strips to reciprocate perpendicularly to the build up of the contaminants and debris. Preferably, the cleaning strips are disposable, and thus may be peeled off and discarded after use, eliminating the risk of redepositing contaminants onto the heads during subsequent cleanings.

A projecting shield is present on the same surface of the member as the cleaning strip. Such a shield is present on both surfaces of the member in devices in which a cleaning strip is present on both surfaces. Preferably, the shield extends farther away from the surface of the member than does the cleaning strip. The shield also is wider than the cleaning strip. The shield protects the cleaning strip from damage during passage into or from the receiving area of the disc drive unit.

BRIEF DESCRIPTION OF THE DRAWINGS

The foregoing and other objects and advantages of the invention will be appreciated more fully from the following drawings in which.

DESCRIPTION OF THE PREFERRED EMBODIMENTS

The present invention is a cleaning device for cleaning the read/write head of a disc drive unit. FIGS. 1 to 5 illustrate two alternative embodiments of cleaning devices according to the invention for cleaning the read/write heads of a floppy diskette drive unit. FIGS. 6 to 9 illustrate these cleaning devices when inserted into a floppy diskette drive unit.

Figure 1:
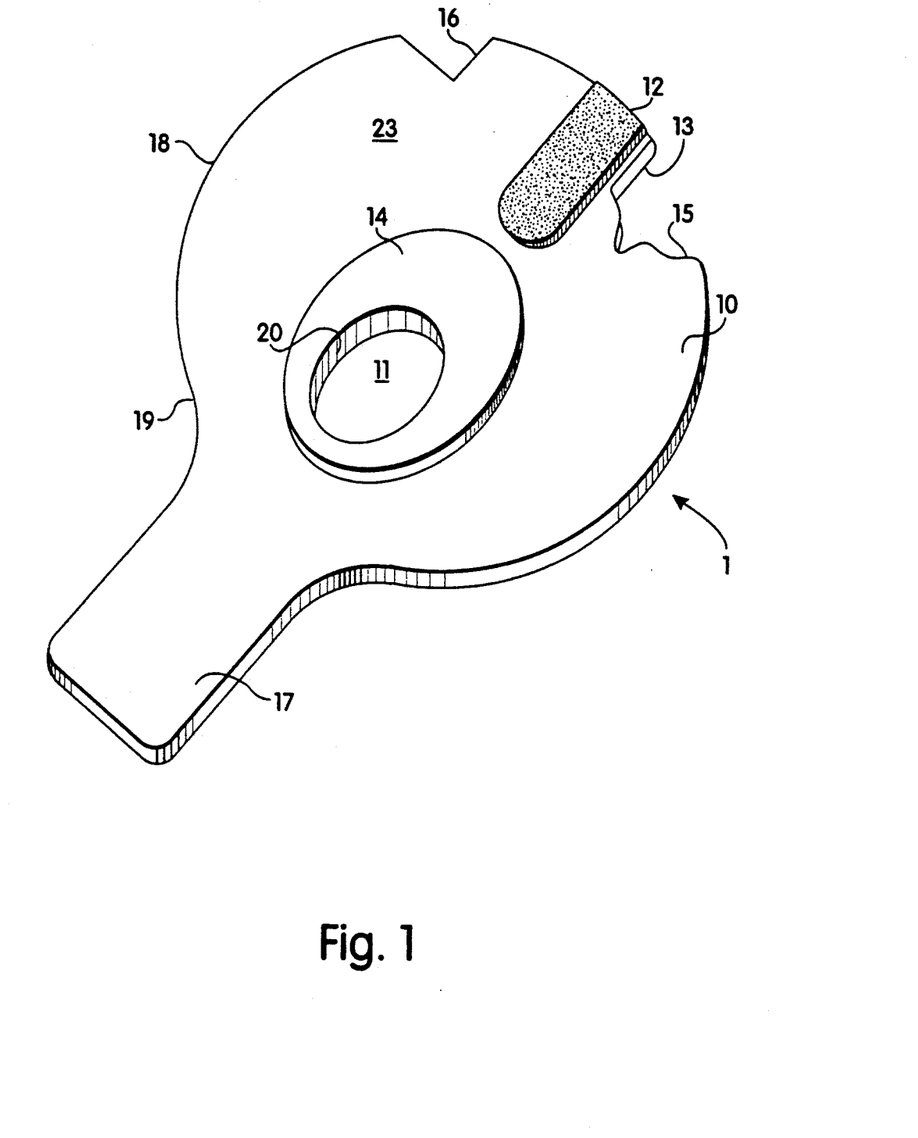
FIG. 1 is a perspective view of the cleaning device of the preferred embodiment of the invention which can be used to clean floppy diskette drives commonly known as three and one half inch floppy diskette drives.
Figure 7:
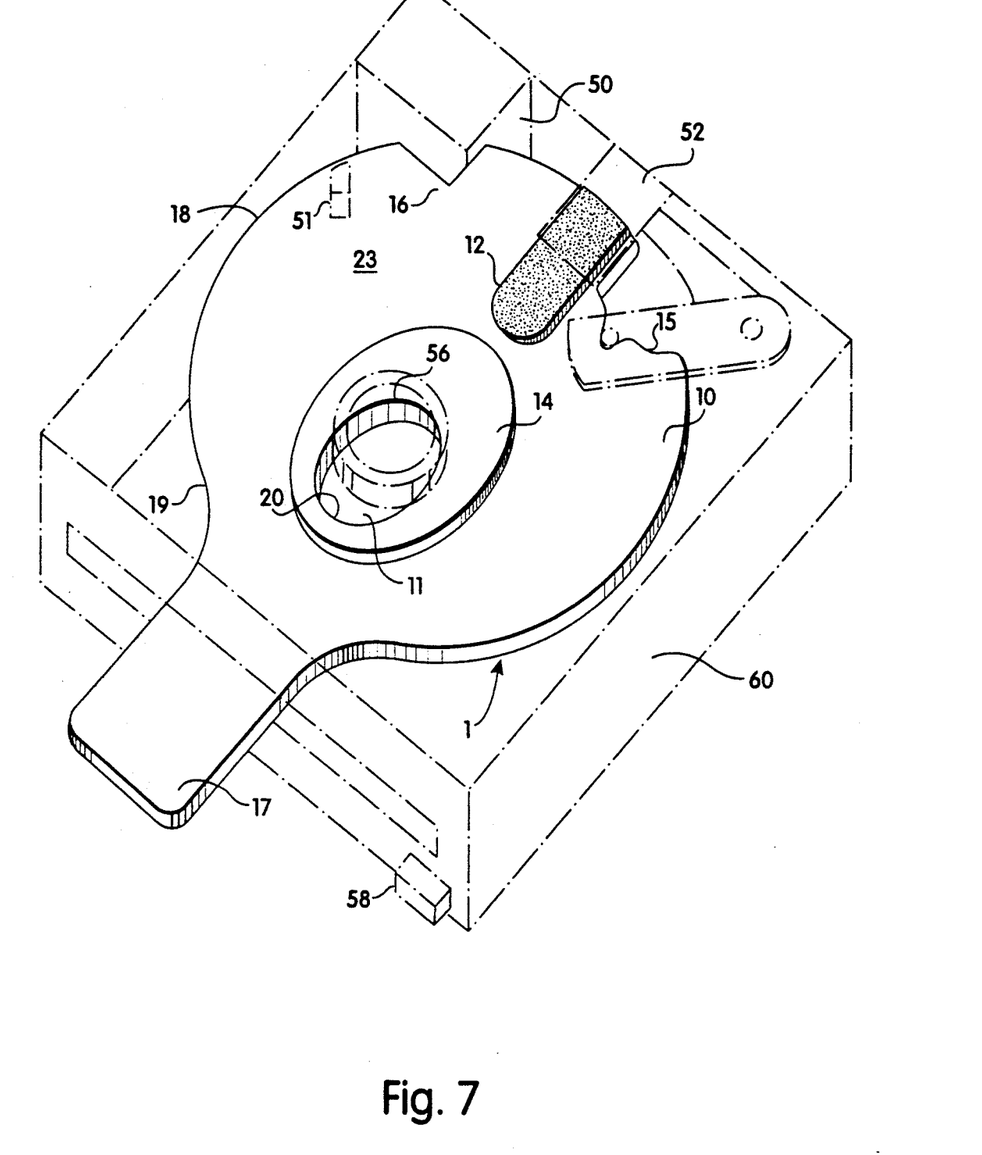
FIG. 7 is a perspective view, partly in phantom, of the device shown in FIG. 1 inserted into the receiving area of a three and one half inch floppy diskette drive.
Figure 8:
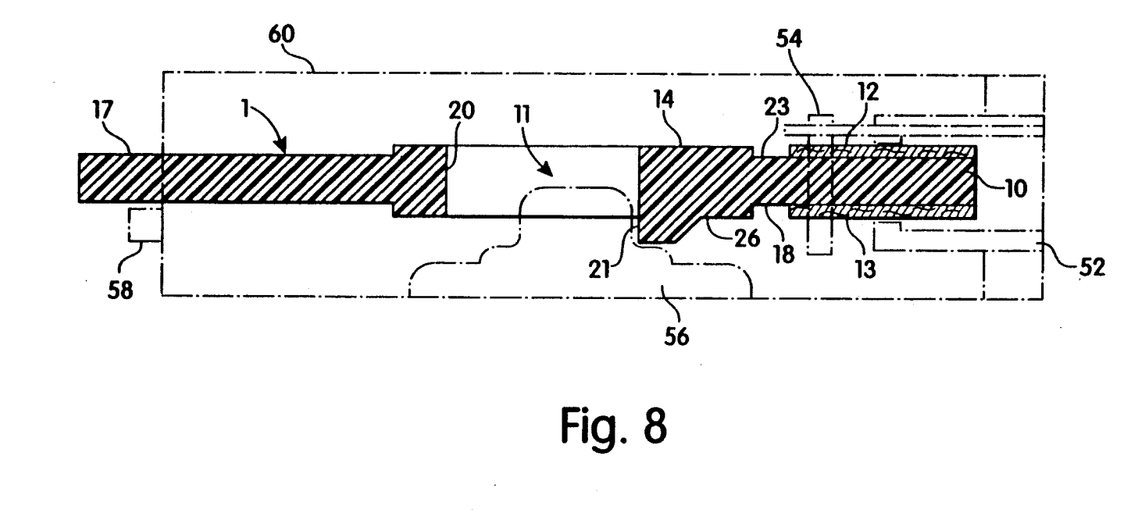
FIG. 8 is a longitudinal cross-sectional view, partly in phantom, of the device and floppy diskette drive of FIG. 7.

In one embodiment of the present invention illustrated in FIG. 1, the device 1 includes a substantially round member 10 preferably of rigid plastic material, with dimensions allowing insertion into the receiving area of a three and one half inch floppy diskette drive unit. The cleaning device has an elongated aperture 11 which is larger than the outer periphery of the drive spindle 56 of the floppy diskette drive unit 60. The elongated aperture 11 permits clearance of the activated drive spindle 56 as the cleaning device is moved back and forth in the floppy diskette drive unit 60, as illustrated in FIGS. 7 and 8. Elongated aperture 11 preferably is elongated in the direction parallel to the longitudinal axis of the cleaning device, thereby permitting forward and rearward movement of the cleaning device. Alternatively, the elongated aperture 11 is elongated in the direction transversely when side to side cleaning is intended. Notch 16, and grooves 22 and 24 on the reverse side of the cleaning device, allow clearance from the internal structural projections 50 and stabilizing pins 51 common to three and one half inch floppy diskette drives when the cleaning tool has been fully inserted.

As shown in FIG. 1, cleaning strips 12 and 13 are attached to surfaces 23 and 18, respectively. Cleaning strips 12 and 13 are wetted with a cleaning solution prior to insertion of the cleaning device into the floppy diskette drive unit. Engagement notch 15, upon insertion of the cleaning device into the floppy diskette drive, activates the mechanical apparatus of the drive to bring the read/write heads 52 into contact with cleaning strips 12 and 13, as illustrated in FIG. 7. After cleaning, the lock button 58 on the diskette drive unit 60, as shown in FIG. 7, is depressed which retracts the heads 52. Cleaning strips 12 and 13 allow the cleaning device to be used with drives that have dual read/write heads that contact both sides of a data diskette.

Figure 2:
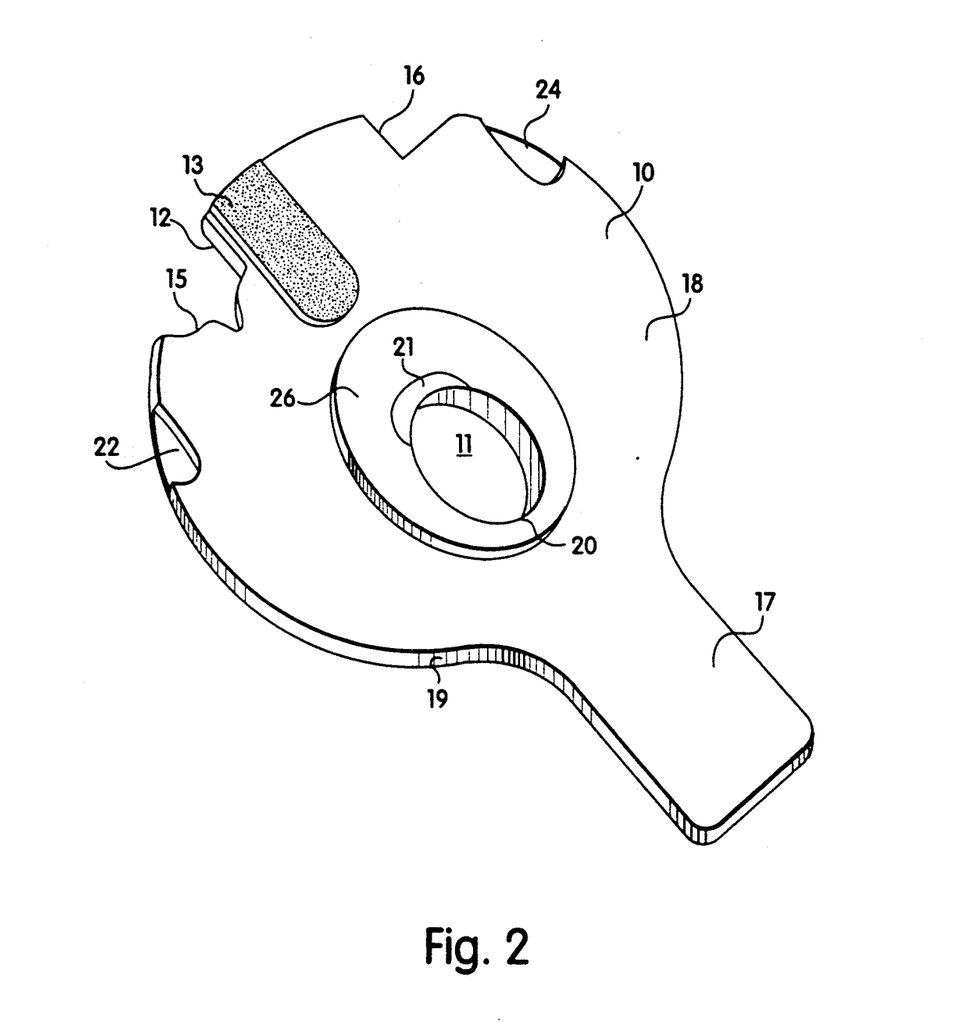
FIG. 2 is a perspective view showing the reverse side of the device of FIG. 1.
Figure 4:
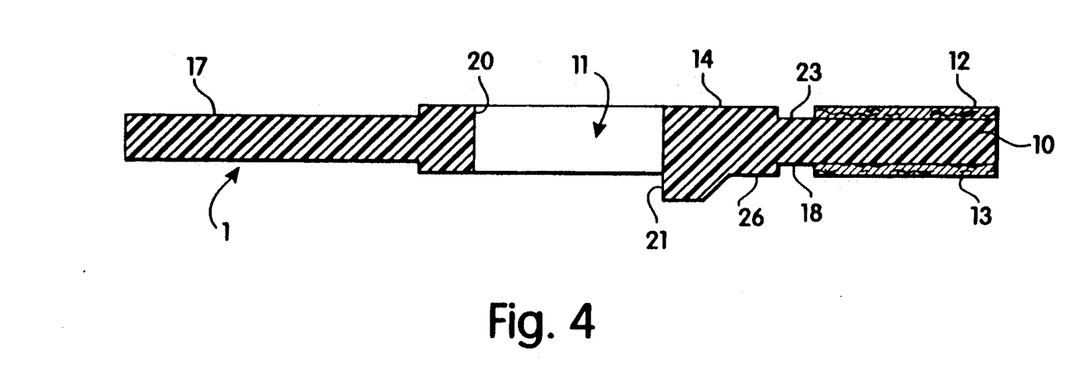
FIG. 4 is a longitudinal cross sectional view of the device of FIG. 1.
Figure 5:
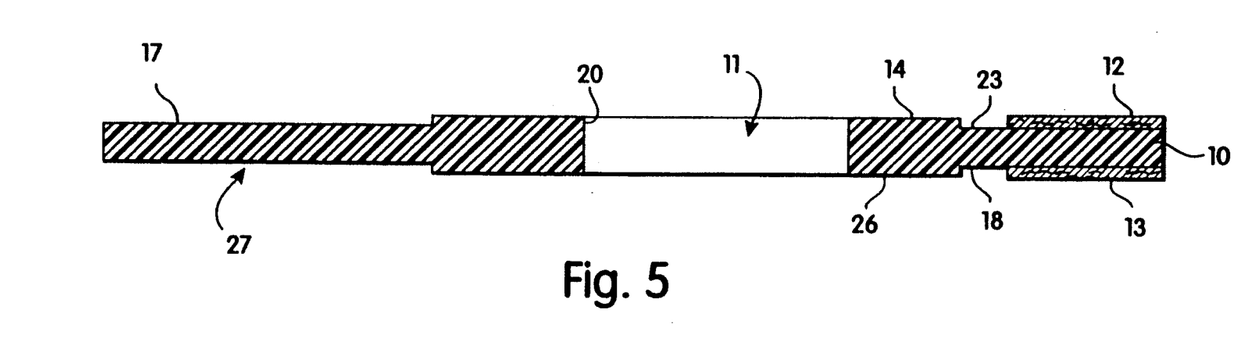
FIG. 5 is a longitudinal cross-sectional view of the device of FIG. 3.

As shown in FIG. 1, reciprocating movement of the cleaning device is accomplished manually by means of handle 17 which extends from the proximal end 19 of member 10. As shown in FIGS. 7 and 8, the forward movement of member 10 within the floppy diskette drive 60 is stopped when proximal edge 20 comes in contact with the drive spindle 56 of the diskette drive 60. And, as shown in FIG. 2, the rearward movement of member 10 within the floppy diskette drive 60 is stopped when raised distal edge 21 of the shield 26 comes in contact with the drive spindle 56 of the diskette drive 60. As shown in FIGS. 2, 4 and 8, edge 21 is tapered, to facilitate movement of the cleaning tool relative to the internal structure of the disk drive unit 60. Cleaning strips 12 and 13 move over the surface of the read/write heads 52 of the floppy diskette drive 60 as a result of the selective forward and rearward movement of the handle 17; be it lateral, longitudinal or random. The contaminants and other debris become embedded in the fibrous material of cleaning strips 12 and 13 and are removed from the surface of the heads without having to turn on the computer.

As shown in FIGS. 1 and 4, the shield 14 protects cleaning strip 12 from being damaged during entry or exit of the cleaning device from the receiving area 62 of the floppy diskette drive unit 60. Likewise, as shown in FIGS. 2 and 4, shield 26 protects cleaning strip 13, on the reverse side 18 of member 10, from damage. The shield 14 preferably is made of plastic and surrounds the side of the elongated aperture 11 proximate the cleaning strips 12 and 13. The surface of the shield 14 facing the cleaning strips 12 and 13 preferably is convex. The shield 14 tapers inwardly towards the distal tip thereof.

Figure 3:
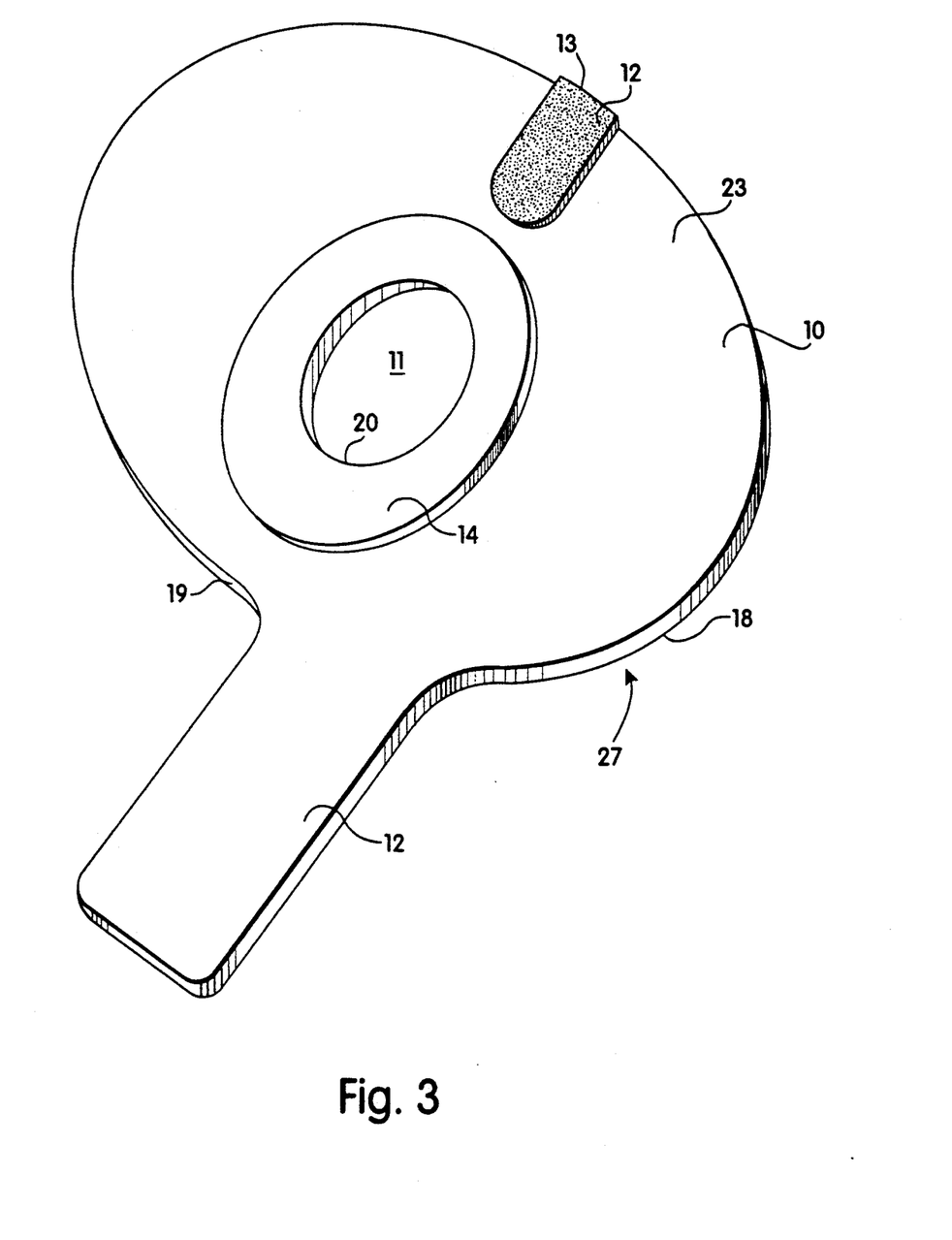
FIG. 3 is a perspective view of an alternative embodiment of the invention which can be used to clean floppy diskette drives commonly known as five and one quarter inch floppy diskette drives.
Figure 6:
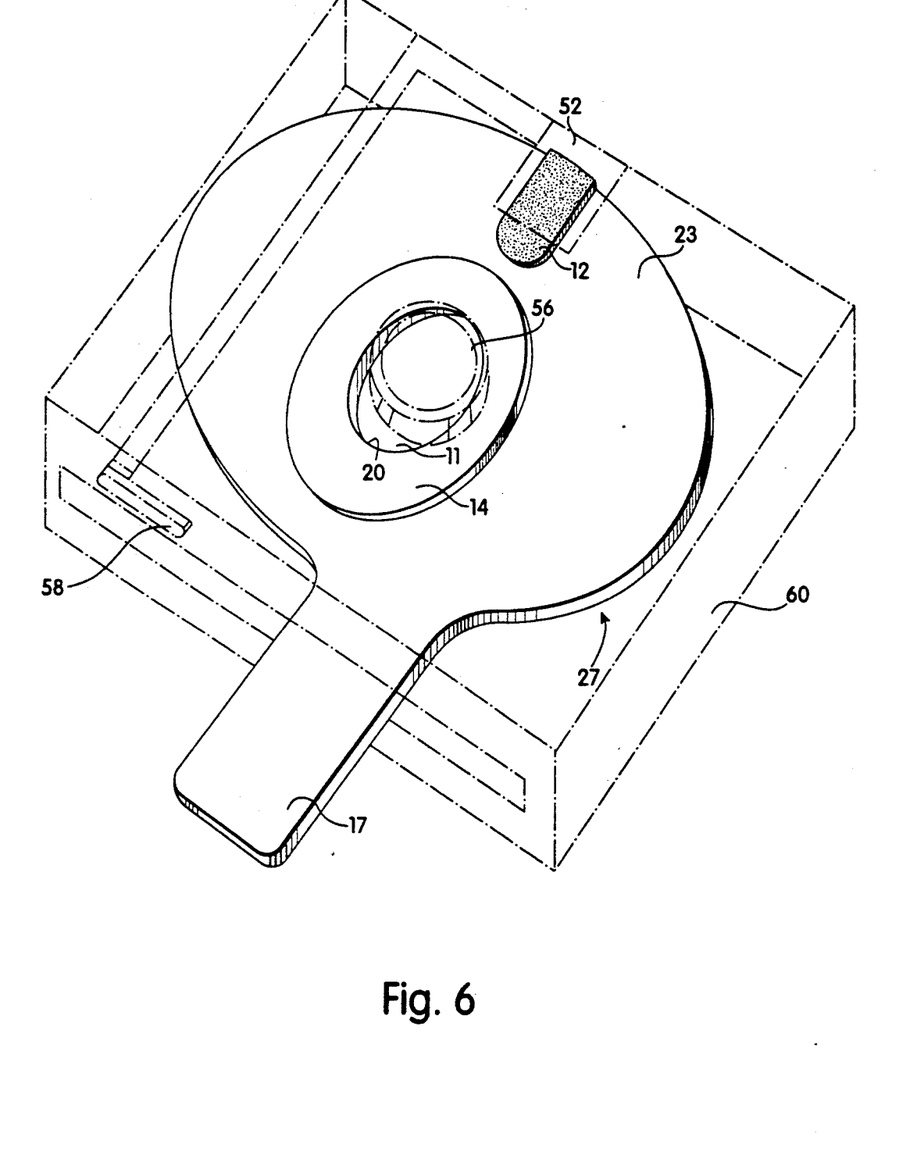
FIG. 6 is a perspective view, partly in phantom, of the device shown in FIG. 3 inserted into the receiving area of a five and one quarter inch floppy diskette drive.
Figure 9:
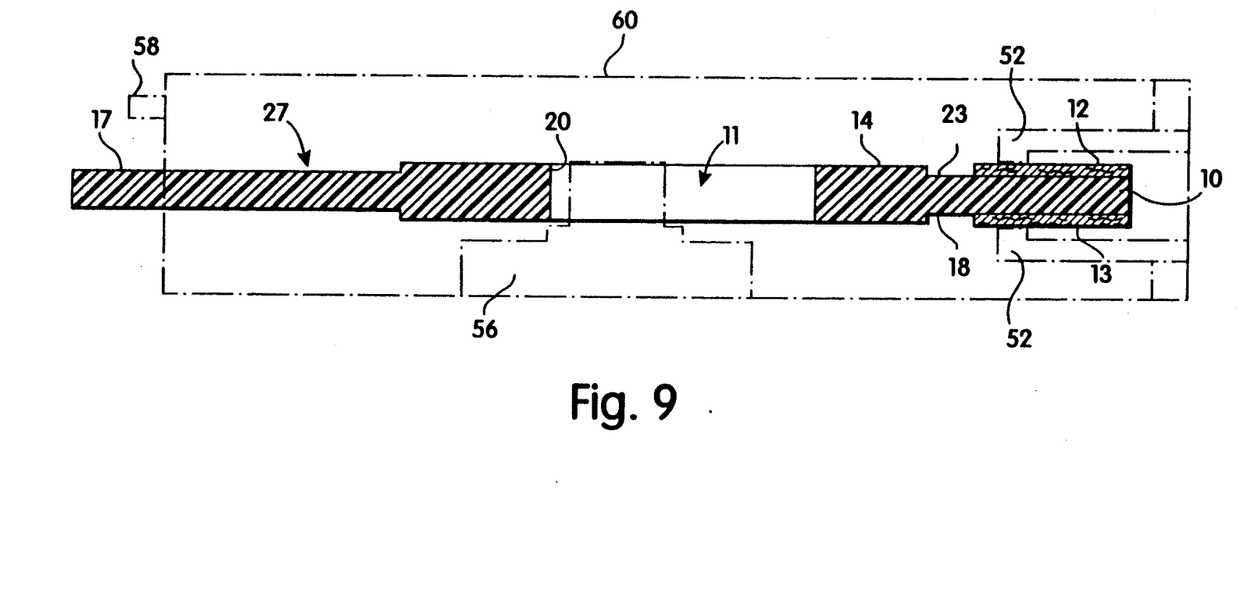
FIG. 9 is a longitudinal cross sectional view, partly in phantom, of the device and floppy diskette drive of FIG. 6.

FIGS. 3, 6 and 9 illustrate an alternative embodiment of the invention showing a cleaning device 27 for cleaning the read/write heads of a five and one quarter inch floppy diskette drive. Cleaning device 27 is substantially the same as the cleaning device 1 shown in FIGS. 1-2; the primary distinction being that the cleaning device 27 does not include peripheral notches or stabilizing pin grooves as required for a cleaning tool to be used with a three and one half inch floppy diskette drive unit. For ease of convenience, elements of tool 27 that are common to like elements of tool 1 in FIGS. 1-2 are identified by like numerals.

It will be appreciated that while the cleaning devices have been described for cleaning the read/write head of floppy diskette drive units, with appropriate shape modifications, it could be used for cleaning a read/write or recording/playback head of any disc drive unit, including audio and video devices.

It should be understood that the foregoing description of the invention is intended merely to be illustrative thereof and that other embodiments and modifications may be apparent to those of skill in the art.

What is claimed is:

1. A cleaning device for cleaning a head of a disc drive unit, comprising:
 a member adapted for insertion into and removal from a receiving area of the disc drive unit;
 cleaning means supported by said member for cleaning the head of the disc drive unit;
 said member having an elongated aperture extending therethrough, said aperture being constructed and designed to permit reciprocating movement of said member relative to a drive spindle of the disc drive unit which extends through at least a portion of said aperture when said member is fully inserted within the receiving area of the disc drive unit.

2. The cleaning device of claim 1 wherein said member is rigid.

3. The cleaning device of claim 1 wherein said cleaning means is removably supported by said member.

4. The cleaning device of claim 1 wherein said aperture is elongated in a direction parallel to the longitudinal axis of said member.

5. The cleaning device of claim 1 wherein said aperture is elongated in a direction transverse to a longitudinal axis of said member.

6. The cleaning device of claim 1 wherein said aperture has a perimeter that is larger than the outer perimeter of the drive spindle of the disc drive unit.

7. A cleaning device for cleaning a head of a disc drive unit, comprising:
- a member adapted for insertion into and removal from a receiving area of the disc drive unit;
- a cleaning means supported by said member for cleaning the head of the disc drive unit; and
- a shield extending from said member relative to said cleaning means for shielding said cleaning means during entry and removal from the receiving area of the disc drive unit.

8. The cleaning device of claim 3 wherein said shield extends beyond the surface of said cleaning means.

9. The cleaning device of claim 7 wherein said shield extends laterally beyond the sides of said cleaning means.

10. The cleaning device of claim 7 wherein said member further includes an elongated aperture extending therethrough, said aperture being constructed and designed to permit reciprocating movement of said member relative to a drive spindle of the disc drive unit which extends through at least a portion of said aperture when said member is fully inserted within the receiving area of the disc drive unit; and wherein at least a portion of said shield is positioned between said cleaning means and said elongated aperture.

11. The cleaning device of claim 10 wherein said shield is contiguous with at least a portion of the periphery of said elongated aperture.

12. The cleaning device of claim 7 wherein said shield has a curved surface relative to said cleaning means.

13. The cleaning device of claim 12 wherein said curved surface is convex.

14. The cleaning device of claim 7 wherein said shield tapers inwardly towards a distal tip.

15. A cleaning device for cleaning a head of a disc drive unit, comprising:
- a member adapted for insertion into and removal from a receiving area of the disc drive unit;
- a cleaning means supported by said member for cleaning the head of the disc drive unit; and
- an elongated handle extending from said member.

16. The cleaning device of claim 15 wherein said elongated handle extends from a proximal end of said member and said cleaning means is supported along the distal end of said member.

17. The cleaning device of claim 1 wherein said elongated handle is aligned with the longitudinal axis of said member.

18. The cleaning device of claim 15 wherein said elongated handle is off set relative to the longitudinal axis of said member.

19. The cleaning device of claim 15 wherein said elongated handle and said member are co planar.

20. The cleaning device of claim 19 wherein said elongated handle and said member are integral.

21. A cleaning device for cleaning a head of a disc drive unit, comprising:
- a cleaning member adapted for insertion into and removal from a receiving area of the disc drive unit;
- a cleaning means supported by said member for cleaning the head of the disc drive unit;
- said member having a first peripheral notch on one side of said cleaning means constructed and designed for clearing an internal projection of the disc drive unit when said member is fully inserted within the receiving area of the disc drive unit; and
- said member having a second peripheral notch on the other side of said cleaning means constructed and designed for engaging an engagement pin of the disc drive unit when said member is fully inserted within the receiving area of the disc drive unit.

22. A cleaning device for cleaning a head of a disc drive unit, comprising:
- a substantially round rigid member adapted for insertion into and removal from a receiving area of the disc drive unit;
- an elongated strip of cleaning material supported along the distal end of said substantially round rigid member for cleaning the head of the disc drive unit, said strip being elongated in the direction parallel to the longitudinal axis of said substantially round rigid member;
- said substantially round rigid member having an elongated aperture elongated in the direction parallel to the longitudinal axis of said substantially round rigid member and extending therethrough, said aperture being constructed and designed to permit reciprocating movement of said substantially round rigid member relative to a drive spindle of the disc drive unit which extends through at least a portion of said aperture when said substantially round rigid member is received within the receiving area of the disc drive unit;
- a shield projecting from said substantially round rigid member for protecting said cleaning means from damage during entry or exit of said cleaning means from the receiving area of the disc. drive unit, said shield surrounding at least a portion of the periphery of said aperture; and
- an elongated rigid handle co-planar with said substantially round rigid member and extending integrally from the proximal end of said substantially round rigid member.

23. The cleaning device recited in claim 22 wherein said substantially round rigid member further includes a first peripheral notch on one side of said cleaning means constructed and designed for clearing an internal projection of the disc drive unit when said substantially round rigid member is fully inserted within the receiving area of the disc drive unit, and said substantially round rigid member having a second peripheral notch on the other side of said cleaning means constructed and designed for engaging an engagement pin of the disc drive unit when said substantially round rigid member is fully inserted within the receiving area of the disc drive unit.

* * * * *